US008301581B2

(12) United States Patent
Zmolek

(10) Patent No.: US 8,301,581 B2
(45) Date of Patent: Oct. 30, 2012

(54) GROUP COMPOSITING ALGORITHMS FOR PRESENCE

(75) Inventor: Andrew Zmolek, Westminster, CO (US)

(73) Assignee: Avaya Inc., Basking Ridge, NJ (US)

( * ) Notice: Subject to any disclaimer, the term of this patent is extended or adjusted under 35 U.S.C. 154(b) by 495 days.

(21) Appl. No.: 12/566,436

(22) Filed: Sep. 24, 2009

(65) Prior Publication Data

US 2011/0071972 A1 Mar. 24, 2011

(51) Int. Cl.
*G06F 15/00* (2006.01)
*G06F 15/18* (2006.01)

(52) U.S. Cl. ............ 706/62; 706/45; 706/47; 455/414.1

(58) Field of Classification Search ........................ None
See application file for complete search history.

(56) References Cited

U.S. PATENT DOCUMENTS

| | | | |
|---|---|---|---|
| 4,817,130 A | 3/1989 | Frimmel, Jr. |
| 4,941,168 A | 7/1990 | Kelly, Jr. |
| 5,001,710 A | 3/1991 | Gawrys et al. |
| 5,003,577 A | 3/1991 | Ertz et al. |
| 5,007,076 A | 4/1991 | Blakley |
| 5,153,905 A | 10/1992 | Bergeron et al. |
| 5,185,782 A | 2/1993 | Srinivasan |
| 5,206,903 A | 4/1993 | Kohler et al. |
| 5,313,515 A | 5/1994 | Allen et al. |
| 5,329,578 A | 7/1994 | Brennan et al. |
| 5,341,414 A | 8/1994 | Popke |
| 5,371,534 A | 12/1994 | Dagdeviren et al. |
| 5,410,343 A | 4/1995 | Coddington et al. |
| 5,430,792 A | 7/1995 | Jesurum et al. |
| 5,434,908 A | 7/1995 | Klein |
| 5,493,692 A | 2/1996 | Theimer et al. |
| 5,511,112 A | 4/1996 | Szlam |
| 5,555,376 A | 9/1996 | Theimer et al. |
| 5,590,178 A | 12/1996 | Murakami et al. |
| 5,706,329 A | 1/1998 | Foladare et al. |
| 5,712,902 A | 1/1998 | Florence et al. |

(Continued)

FOREIGN PATENT DOCUMENTS

EP 0886416 12/1998

(Continued)

OTHER PUBLICATIONS

Moran, et al. "Requirements for Presence specific Event Notification Filters"; http://www.tools.ietf.org/html/draft-moran-simple-pres-filter-reqs-00; Jan. 2003; 9 pages.

(Continued)

*Primary Examiner* — Omar Fernandez Rivas
(74) *Attorney, Agent, or Firm* — Sheridan Ross P.C.

(57) ABSTRACT

Systems and methods presented herein construct groups and determine the presence for the groups. The groups can be constructed based on business logic. A set of components can model a group from the business logic, can establish a membership for the group, can determine one or more rules that govern presence determination for the membership, and can provide the group model, membership information, and the one or more rules to a rules engine. The rules engine can evaluate presence within the group model based on the membership and the one or more rules. The group presence can then be provided to one or more entities, applications, or workflows that subscribe to the rules engine for the group presence.

19 Claims, 8 Drawing Sheets

U.S. PATENT DOCUMENTS

| | | | |
|---|---|---|---|
| 5,742,763 A | 4/1998 | Jones | |
| 5,802,510 A | 9/1998 | Jones | |
| 5,805,587 A | 9/1998 | Norris et al. | |
| 5,819,084 A | 10/1998 | Shapiro et al. | |
| 5,826,039 A | 10/1998 | Jones | |
| 5,828,747 A | 10/1998 | Fisher et al. | |
| 5,864,874 A | 1/1999 | Shapiro | |
| 5,894,504 A | 4/1999 | Alfred et al. | |
| 5,903,726 A | 5/1999 | Donovan et al. | |
| 5,905,793 A | 5/1999 | Flockhart et al. | |
| 5,982,873 A | 11/1999 | Flockhart et al. | |
| 5,999,611 A | 12/1999 | Tatchell et al. | |
| 6,018,655 A | 1/2000 | Bartle et al. | |
| 6,031,896 A | 2/2000 | Gardell et al. | |
| 6,038,296 A | 3/2000 | Brunson et al. | |
| 6,046,762 A | 4/2000 | Sonesh et al. | |
| 6,068,188 A | 5/2000 | Knowles | |
| 6,088,441 A | 7/2000 | Flockhart et al. | |
| 6,094,681 A | 7/2000 | Shaffer et al. | |
| 6,128,304 A | 10/2000 | Gardell et al. | |
| 6,130,937 A | 10/2000 | Fotta | |
| 6,144,644 A | 11/2000 | Bajzath et al. | |
| 6,154,738 A | 11/2000 | Call | |
| 6,163,607 A | 12/2000 | Bogart et al. | |
| 6,167,266 A | 12/2000 | Havinis et al. | |
| 6,169,795 B1 | 1/2001 | Dunn et al. | |
| 6,173,053 B1 | 1/2001 | Bogart et al. | |
| 6,185,603 B1 | 2/2001 | Henderson et al. | |
| 6,188,756 B1 | 2/2001 | Mashinsky | |
| 6,192,122 B1 | 2/2001 | Flockhart et al. | |
| 6,199,048 B1 | 3/2001 | Hudetz et al. | |
| 6,208,870 B1 | 3/2001 | Lorello et al. | |
| 6,212,265 B1 | 4/2001 | Duphorne | |
| 6,215,784 B1 | 4/2001 | Petras et al. | |
| 6,226,360 B1 | 5/2001 | Goldberg et al. | |
| 6,272,319 B1 | 8/2001 | Narusawa | |
| 6,298,062 B1 | 10/2001 | Gardell et al. | |
| 6,301,609 B1 | 10/2001 | Aravamudan et al. | |
| 6,307,931 B1 | 10/2001 | Vaudreuil | |
| 6,310,947 B1 | 10/2001 | Polcyn | |
| 6,311,231 B1 | 10/2001 | Bateman et al. | |
| 6,317,593 B1 | 11/2001 | Vossler | |
| 6,330,243 B1 | 12/2001 | Strandberg | |
| 6,330,317 B1 | 12/2001 | Garfinkel | |
| 6,332,081 B1 | 12/2001 | Do | |
| 6,360,222 B1 | 3/2002 | Quinn | |
| 6,408,177 B1 | 6/2002 | Parikh et al. | |
| 6,411,682 B1 | 6/2002 | Fuller et al. | |
| 6,430,271 B1 | 8/2002 | DeJesus et al. | |
| 6,430,602 B1 | 8/2002 | Kay et al. | |
| 6,430,604 B1 | 8/2002 | Ogle et al. | |
| 6,449,260 B1 | 9/2002 | Sassin et al. | |
| 6,456,711 B1 | 9/2002 | Cheung et al. | |
| 6,463,299 B1 | 10/2002 | Macor | |
| 6,463,471 B1 | 10/2002 | Dreke et al. | |
| 6,477,373 B1 | 11/2002 | Rappaport et al. | |
| 6,477,374 B1 | 11/2002 | Shaffer et al. | |
| 6,480,484 B2 | 11/2002 | Morton | |
| 6,535,600 B1 | 3/2003 | Fisher et al. | |
| 6,546,097 B1 | 4/2003 | Peltz | |
| 6,549,612 B2 | 4/2003 | Gifford et al. | |
| 6,560,318 B1 | 5/2003 | Spielman et al. | |
| 6,561,805 B2 | 5/2003 | Kumar | |
| 6,587,681 B1 | 7/2003 | Sawai | |
| 6,614,783 B1 | 9/2003 | Sonesh et al. | |
| 6,636,587 B1 | 10/2003 | Nagai et al. | |
| 6,643,360 B1 | 11/2003 | Reine | |
| 6,658,095 B1 * | 12/2003 | Yoakum et al. | 379/93.01 |
| 6,665,534 B1 | 12/2003 | Conklin et al. | |
| 6,668,167 B2 | 12/2003 | McDowell et al. | |
| 6,675,168 B2 | 1/2004 | Shapiro et al. | |
| 6,700,967 B2 | 3/2004 | Kleinoder et al. | |
| 6,707,890 B1 | 3/2004 | Gao et al. | |
| 6,738,462 B1 | 5/2004 | Brunson | |
| 6,741,586 B1 | 5/2004 | Schuster et al. | |
| 6,750,897 B1 | 6/2004 | Moshrefi et al. | |
| 6,751,453 B2 | 6/2004 | Schemers et al. | |
| 6,751,459 B1 | 6/2004 | Lee et al. | |
| 6,788,773 B1 | 9/2004 | Fotta | |
| 6,789,120 B1 | 9/2004 | Lee et al. | |
| 6,795,429 B1 | 9/2004 | Schuster et al. | |
| 6,807,423 B1 * | 10/2004 | Armstrong et al. | 455/440 |
| 6,839,735 B2 | 1/2005 | Wong et al. | |
| 6,865,384 B2 | 3/2005 | Sagi et al. | |
| 6,868,140 B2 | 3/2005 | Myers et al. | |
| 6,868,395 B1 | 3/2005 | Szlam et al. | |
| 6,871,062 B2 | 3/2005 | Trop et al. | |
| 6,879,677 B2 | 4/2005 | Trandal et al. | |
| 6,879,828 B2 | 4/2005 | Virtanen et al. | |
| 6,888,927 B1 | 5/2005 | Cruickshank et al. | |
| 6,891,933 B2 | 5/2005 | Kumamoto | |
| 6,891,934 B1 | 5/2005 | Gao et al. | |
| 6,925,166 B1 | 8/2005 | Chan | |
| 6,937,597 B1 | 8/2005 | Rosenberg et al. | |
| 6,968,052 B2 | 11/2005 | Wullert, II | |
| 6,968,179 B1 | 11/2005 | DeVries | |
| 6,987,765 B2 | 1/2006 | March et al. | |
| 6,988,126 B2 | 1/2006 | Wilcock et al. | |
| 6,999,731 B2 | 2/2006 | Cronin | |
| 7,003,087 B2 | 2/2006 | Spencer et al. | |
| 7,020,480 B2 | 3/2006 | Coskun et al. | |
| 7,023,971 B1 | 4/2006 | Huart et al. | |
| 7,023,980 B2 | 4/2006 | Lenard | |
| 7,027,586 B2 | 4/2006 | Bushey et al. | |
| 7,035,385 B2 | 4/2006 | Levine et al. | |
| 7,035,923 B1 * | 4/2006 | Yoakum et al. | 709/224 |
| 7,039,040 B1 | 5/2006 | Burg | |
| 7,054,939 B2 | 5/2006 | Koch et al. | |
| 7,058,036 B1 | 6/2006 | Yu et al. | |
| 7,068,762 B2 | 6/2006 | Skladman et al. | |
| 7,074,853 B2 | 7/2006 | Smith et al. | |
| 7,080,321 B2 | 7/2006 | Aleksander et al. | |
| 7,092,370 B2 | 8/2006 | Jiang et al. | |
| 7,099,867 B2 | 8/2006 | Okada et al. | |
| 7,103,155 B2 | 9/2006 | Caharel et al. | |
| 7,123,647 B1 | 10/2006 | Amir et al. | |
| 7,123,697 B2 | 10/2006 | Amir et al. | |
| 7,130,390 B2 | 10/2006 | Abburi | |
| 7,158,630 B2 | 1/2007 | Fotta et al. | |
| 7,171,473 B1 | 1/2007 | Eftis et al. | |
| 7,192,235 B2 | 3/2007 | Blight et al. | |
| 7,215,760 B2 | 5/2007 | Lenard | |
| 7,218,626 B2 | 5/2007 | Shaheen et al. | |
| 7,245,713 B1 | 7/2007 | Simpson et al. | |
| 7,246,371 B2 | 7/2007 | Diacakis et al. | |
| 7,248,677 B2 | 7/2007 | Randall et al. | |
| 7,269,162 B1 | 9/2007 | Turner | |
| 7,269,247 B2 | 9/2007 | Mashinsky | |
| 7,283,805 B2 | 10/2007 | Agrawal | |
| 7,283,808 B2 | 10/2007 | Castell et al. | |
| 7,287,056 B2 | 10/2007 | Loveland et al. | |
| 7,299,259 B2 | 11/2007 | Petroyikh | |
| 7,313,617 B2 | 12/2007 | Malik et al. | |
| 7,340,246 B1 | 3/2008 | Kanerva et al. | |
| 7,346,696 B2 * | 3/2008 | Malik | 709/229 |
| 7,356,137 B1 | 4/2008 | Burg et al. | |
| 7,359,496 B2 | 4/2008 | Qian et al. | |
| 7,398,061 B2 | 7/2008 | Mousseau | |
| 7,436,939 B1 | 10/2008 | Packingham et al. | |
| 7,436,945 B2 | 10/2008 | Agrawal et al. | |
| 7,437,162 B1 | 10/2008 | Zhang et al. | |
| 7,474,741 B2 | 1/2009 | Brunson | |
| 7,487,095 B2 | 2/2009 | Hill et al. | |
| 7,492,872 B1 | 2/2009 | Di Carlo et al. | |
| 7,512,653 B2 * | 3/2009 | Krishnasamy et al. | 709/204 |
| 7,536,437 B2 | 5/2009 | Zmolek | |
| 7,542,558 B2 | 6/2009 | Klein et al. | |
| 7,573,996 B1 | 8/2009 | Somani | |
| 7,602,895 B2 | 10/2009 | Terry et al. | |
| 7,609,663 B2 | 10/2009 | Neuhaus et al. | |
| 7,769,154 B1 | 8/2010 | Craft et al. | |
| 2001/0006893 A1 | 7/2001 | Yoshioka | |
| 2001/0012286 A1 | 8/2001 | Huna et al. | |
| 2001/0029176 A1 | 10/2001 | Taniguchi | |
| 2002/0019829 A1 | 2/2002 | Shapiro | |
| 2002/0021307 A1 | 2/2002 | Glenn et al. | |
| 2002/0023132 A1 * | 2/2002 | Tornabene et al. | 709/205 |

| | | |
|---|---|---|
| 2002/0024958 A1 | 2/2002 | Iveland et al. |
| 2002/0032040 A1 | 3/2002 | Tsukamoto |
| 2002/0035605 A1 | 3/2002 | McDowell et al. |
| 2002/0052225 A1 | 5/2002 | Davis et al. |
| 2002/0055350 A1 | 5/2002 | Gupte et al. |
| 2002/0065894 A1 | 5/2002 | Dalai et al. |
| 2002/0069081 A1 | 6/2002 | Ingram et al. |
| 2002/0076010 A1 | 6/2002 | Sahel |
| 2002/0076025 A1 | 6/2002 | Liversidge et al. |
| 2002/0082931 A1 | 6/2002 | Siegel et al. |
| 2002/0085701 A1 | 7/2002 | Parsons et al. |
| 2002/0087630 A1 | 7/2002 | Wu |
| 2002/0098831 A1 | 7/2002 | Castell et al. |
| 2002/0116336 A1 | 8/2002 | Diacakis et al. |
| 2002/0116461 A1 | 8/2002 | Diacakis et al. |
| 2002/0126701 A1 | 9/2002 | Requena |
| 2002/0131395 A1 | 9/2002 | Wang |
| 2002/0160757 A1 | 10/2002 | Shavit et al. |
| 2002/0176558 A1 | 11/2002 | Tate et al. |
| 2003/0014491 A1 | 1/2003 | Hovitz et al. |
| 2003/0018720 A1 | 1/2003 | Chang et al. |
| 2003/0026289 A1 | 2/2003 | Mukherjee et al. |
| 2003/0028597 A1 | 2/2003 | Salmi et al. |
| 2003/0028621 A1 | 2/2003 | Furlong et al. |
| 2003/0037103 A1 | 2/2003 | Salmi et al. |
| 2003/0041101 A1 | 2/2003 | Hansche et al. |
| 2003/0065788 A1 | 4/2003 | Salomaki |
| 2003/0073440 A1 | 4/2003 | Mukhegee et al. |
| 2003/0086390 A1 | 5/2003 | Eschbach et al. |
| 2003/0110228 A1 | 6/2003 | Xu et al. |
| 2003/0110292 A1 | 6/2003 | Takeda et al. |
| 2003/0112952 A1 | 6/2003 | Brown et al. |
| 2003/0115332 A1 | 6/2003 | Honeisen |
| 2003/0130864 A1 | 7/2003 | Ho et al. |
| 2003/0135569 A1 | 7/2003 | Khakoo et al. |
| 2003/0148756 A1 | 8/2003 | Onishi et al. |
| 2003/0154251 A1 | 8/2003 | Manabe |
| 2003/0191762 A1 | 10/2003 | Kalliokulju et al. |
| 2003/0195811 A1 | 10/2003 | Hayes et al. |
| 2003/0217142 A1 | 11/2003 | Bobde et al. |
| 2003/0233415 A1 | 12/2003 | Beyda |
| 2004/0010431 A1 | 1/2004 | Thomas et al. |
| 2004/0062383 A1 | 4/2004 | Sylvain |
| 2004/0078445 A1 | 4/2004 | Malik |
| 2004/0086094 A1 | 5/2004 | Bosik et al. |
| 2004/0120498 A1 | 6/2004 | Sylvain |
| 2004/0133641 A1 | 7/2004 | McKinnon et al. |
| 2004/0136505 A1 | 7/2004 | Garg et al. |
| 2004/0156493 A1 | 8/2004 | Cohen |
| 2004/0189698 A1 | 9/2004 | Bokish |
| 2004/0198427 A1 | 10/2004 | Kimbell et al. |
| 2005/0025295 A1 | 2/2005 | Christie |
| 2005/0031107 A1 | 2/2005 | Fotta |
| 2005/0054361 A1 | 3/2005 | Turcanu et al. |
| 2005/0071642 A1 | 3/2005 | Moghe et al. |
| 2005/0114159 A1 | 5/2005 | Ozugur et al. |
| 2005/0147086 A1 | 7/2005 | Rosenberg et al. |
| 2005/0165894 A1 | 7/2005 | Rosenberg et al. |
| 2005/0165934 A1 | 7/2005 | Rosenberg et al. |
| 2005/0187781 A1 | 8/2005 | Christensen et al. |
| 2005/0198299 A1 | 9/2005 | Beck et al. |
| 2005/0207361 A1 | 9/2005 | Rosenberg et al. |
| 2005/0210104 A1 | 9/2005 | Torvinen |
| 2005/0216565 A1 | 9/2005 | Ito et al. |
| 2005/0216848 A1* | 9/2005 | Thompson et al. ............ 715/753 |
| 2005/0221807 A1 | 10/2005 | Karlsson et al. |
| 2005/0233776 A1 | 10/2005 | Allen et al. |
| 2005/0267895 A1 | 12/2005 | Yoshiuchi et al. |
| 2005/0276407 A1 | 12/2005 | Mohler |
| 2006/0013233 A1 | 1/2006 | Trossen et al. |
| 2006/0167998 A1 | 7/2006 | Yoshiuchi et al. |
| 2006/0248184 A1 | 11/2006 | Wu et al. |
| 2006/0252444 A1 | 11/2006 | Ozugur |
| 2006/0288099 A1* | 12/2006 | Jefferson et al. ............. 709/224 |
| 2007/0067443 A1 | 3/2007 | Seligmann et al. |
| 2007/0087731 A1 | 4/2007 | Karlsson et al. |
| 2007/0106756 A1 | 5/2007 | Eftis et al. |
| 2007/0112965 A1 | 5/2007 | Eftis et al. |
| 2007/0112966 A1 | 5/2007 | Eftis et al. |
| 2007/0121808 A1 | 5/2007 | Brunson et al. |
| 2007/0127699 A1 | 6/2007 | Lenard |
| 2007/0150491 A1* | 6/2007 | Torvinen ........................ 707/100 |
| 2007/0179953 A1* | 8/2007 | Mahoney et al. .................. 707/9 |
| 2007/0274466 A1 | 11/2007 | Tidwell et al. |
| 2008/0019300 A1 | 1/2008 | Perzy et al. |
| 2008/0040441 A1 | 2/2008 | Maes |
| 2008/0049911 A1 | 2/2008 | Hanson et al. |
| 2008/0066080 A1* | 3/2008 | Campbell ...................... 719/314 |
| 2008/0086531 A1* | 4/2008 | Chavda et al. ................. 709/206 |
| 2008/0089488 A1 | 4/2008 | Brunson et al. |
| 2008/0183814 A1* | 7/2008 | Sanghavi ....................... 709/204 |
| 2009/0019367 A1* | 1/2009 | Cavagnari et al. ............. 715/716 |
| 2009/0022286 A1 | 1/2009 | Brunson et al. |
| 2009/0022287 A1 | 1/2009 | Brunson et al. |
| 2009/0022288 A1 | 1/2009 | Brunson et al. |
| 2009/0022289 A1 | 1/2009 | Brunson et al. |
| 2009/0024601 A1 | 1/2009 | Zmolek |
| 2009/0028303 A1 | 1/2009 | Brunson et al. |
| 2009/0034700 A1 | 2/2009 | Brunson et al. |
| 2010/0020728 A1* | 1/2010 | Jefferson et al. .............. 370/260 |
| 2010/0299385 A1* | 11/2010 | Root et al. ..................... 709/202 |

FOREIGN PATENT DOCUMENTS

| | | |
|---|---|---|
| EP | 0930592 | 7/1999 |
| EP | 1259053 | 11/2002 |
| EP | 1261179 | 11/2002 |
| JP | 05-260188 | 10/1993 |
| JP | H8-23577 | 1/1996 |
| JP | 9-200813 | 7/1997 |
| JP | H11-046377 | 2/1999 |
| JP | 11-088495 | 3/1999 |
| JP | H11-187454 | 7/1999 |
| JP | H11-205837 | 7/1999 |
| JP | 2000-102059 | 4/2000 |
| JP | 2000-312258 | 11/2000 |
| JP | 2001-189774 | 7/2001 |
| JP | 2001-224075 | 8/2001 |
| JP | 2001-251395 | 9/2001 |
| JP | 2001-251682 | 9/2001 |
| JP | 2001-350782 | 12/2001 |
| JP | 2002-094614 | 3/2002 |
| JP | 2002-101155 | 4/2002 |
| JP | 2002-108794 | 4/2002 |
| JP | 2002-152335 | 5/2002 |
| JP | 2002-176449 | 6/2002 |
| JP | 2003-8655 | 1/2003 |
| JP | 2003-116175 | 4/2003 |
| JP | 2003-517781 | 5/2003 |
| JP | 2003-169147 | 6/2003 |
| JP | 2003-196469 | 7/2003 |
| JP | 2003-296556 | 10/2003 |
| JP | 2004-013303 | 1/2004 |
| JP | 2004-30371 | 1/2004 |
| WO | WO 97/24010 | 7/1997 |
| WO | WO 98/03923 | 1/1998 |
| WO | WO 98/12644 | 3/1998 |
| WO | WO 00/39964 | 7/2000 |
| WO | WO 00/69140 | 11/2000 |
| WO | WO 01/45368 | 6/2001 |
| WO | WO 01/55915 | 8/2001 |
| WO | WO 01/69387 | 9/2001 |
| WO | WO 01/71925 | 9/2001 |
| WO | WO 02/30105 | 4/2002 |
| WO | WO 02/093959 | 11/2002 |
| WO | WO 03/025776 | 3/2003 |
| WO | WO 03/054717 | 7/2003 |
| WO | WO 03/085539 | 10/2003 |
| WO | WO 03/096559 | 11/2003 |

OTHER PUBLICATIONS

U.S. Appl. No. 11/626,217, filed Jan. 23, 2007, Coughlan.
U.S. Appl. No. 10/865,114, filed Jun. 9, 2004, Craft.
"Customer Service Window," e-Vantage Solutions, 2003, available at http://www.evgl.com/dsw.html, 2 pages.
"MIT Project Oxygen Publications," date unknown, 2 pages.
"Phone Mail Override for Incoming Calls," IBM Technical Disclosure Bulletin, Nov. 1994, vol. 37(11), p. 543.

"The Carrier-Grade, All-IP Contact Center Platform for Next Generation Network-Based Services," CosmoCall Universe™, 2002, 3 pages.

Atkins et al., "Common Presence and Instant Messaging: Message Format," Network Working Group, Jan. 9, 2003, available at http://www.ietf.internet-drafts/draft-ietf-impp-cpim-msgfmt-06.txt, 31 pages.

Berners-Lee et al., "RFC 2396: Uniform Resource Identifiers (URI); Generic Syntax," Network Working Group, Aug. 1998, 38 pages.

Chavez et al., "Interactive Applications of Personal Situation-Aware Assistants," Computers and Graphics, Dec. 1999, vol. 23, No. 6, Pergamon Press LTD., Oxford, GB, pp. 903-915.

Crocker et al., "Common Presence and Instant Messaging (CPIM)," Network Working Group, Aug. 14, 2002, available at http://www.ietf.internet-drafts/draft-ietf-impp-cpim-03.txt, 33 pages.

Dawson et al., "RFC 2426: Vcard MIME Directory Profile," Network Working Group, Sep. 1998, available at http://www.ietf.org/rfc/rfc2426.txt?number=2426, 40 pages.

Day et al., "RFC 2778: A Model for Presence and Instant Messaging," Network Working Group, Internet Engineering Task Force, Feb. 2000, available at http://www.ietf.org/rfc/rfc2277.txt?number=2778, pp. 1-17.

Day et al., "RFC 2779: Instant Messaging/Presence Protocol Requirements," Network Working Group, Feb. 2000, available at http://www.ietf.org/rfc/rfc2779.txt?number=2779, 25 pages.

FaceTime Communications website, "Customer Services," available at http://www.facetime.com/custsvcs.shtm, 2003, 4 pages.

FaceTime Communications website, "Overview," available at http://www.facetime.com/solutions.shtm, 2003, 4 pages.

FaceTime Communications website, "Presence Management," available at http://www.facetime.com/presence.shtm, 2003, 3 pages.

Fielding et al., "RFC 2068: Hypertext Transfer Protocol—HTTP/1.1," Network Working Group, Jan. 1997, 152 pages.

Klyne, "RFC 2703: Protocol—independent Content Negotiation Framework," Network Working Group, Sep. 1999, available at http://www.ietf.org/rfc/rfc2703.txt?number=2703, 19 pages.

Grigonis, Computer Technology Encyclopedia, 2000, pp. 342-345, 389-392.

Gulbrandsen et al., "A DNS RR for Specifying the Location of Services (DNS SRV)," Network Working Group, Feb. 2000, available at http://www.ietf.org/rfc/rfc2782.txt?number=2782, 12 pages.

Holtman et al., "RFC 2296: HTTP Remote Variant Selection Algorithm—RVSA/1.0," Network Working Group, Mar. 1998, available at http://www.ietf.org/rfc/rfc2296.txt?number=2296, 13 pages.

Holtman et al., "RFC 2295: Transparent Content Negotiation in HTTP," Network Working Group, Mar. 1998, available at http://www.ietf.org/rfc/rfc2295.txt?number=2295, 55 pages.

Rosenberg et al., "SIP Extensions for Instant Messaging," Internet Engineering Task Force, Jul. 18, 2001, 22 pages.

Klyne et al., "Instant Messaging using APEX," Network Working Group, Jun. 1, 2001, 19 pages.

Klyne, "RFC 2533: A Syntax for Describing Media Feature Sets," Network Working Group, Mar. 1999, available at http://www.ietf.org/rfc/rfc2533.txt?number=2533, 35 pages.

Live2Support, "Features," available at http://web.archive.org/web/20040206215142/www.live2support.com/features_live_chat.php>, printed Oct. 26, 2005, 4 pages.

Michael, Bill, "The Politics of Naming," www.cConvergence.com, Jul. 2001, pp. 31-35.

MIT Project Oxygen, "Oxygen: Pervasive, Human-Centered Computing," MIT Laboratory for Computer Science, MIT Artificial Intelligence Laboratory, May 2002, 18 pages.

Monegain, "FaceTime gives voice, vision to instant messaging," CC News: Call Center Technology, May 2000, available at http://www.ccnews.com/may2000/depts/cct/cctstory2.htm, 2 pages.

Okuyama et al., "Instant Message Technique for Supporting New Mobile Service," FUZITSU, Fuzitsu Inc., Jul. 13, 2001, vol. 52, the fourth number, pp. 262-267 (translated abstract).

"Ovisoft Messenger—Call Center Solutions," Ovisoft Technologies, available at http://www.ofisoft.com/solutioncallcenter.htm, 2003, 1 page.

Press Release, "Amica Insurance Selects FaceTime Communications to Provide Instant Messaging-Based Customer Service in Enterprise," FaceTime Communications, Jun. 25, 2001, available at http://www.factime.com/pr/pr010625.shtm, 2 pages.

Product Information for CosmoCall Universe™, available at http://www.cosmocom.com/ProductInfo/, copyright 1997-2003, printed Oct. 21, 2003, 18 pages.

Grigonis, R., Computer Telephony Encyclopedia, 2000, pp. 367-375.

Grigonis, R., Computer Telephony Encyclopedia, 2000, pp. 413-430.

Shockey, "ENUM: Phone Numbers Meet the Net," www.cConvergence.com, Jul. 2001, pp. 21-30.

Rose et al., "The APEX Presence Service," Network Working Group, Jan. 14, 2002, available at http://www.ieff.org/internet-drafs/draft-ielf-apex-presence-06.txt, 31 pages.

Rosenberg, "Enterprise Customer Interfaces: Application Messaging Via Instant Messaging," CommWeb.com, Dec. 9, 2002, available at http://www.commweb.com/article/COM20021209S0001/2, 3 pages.

Schulzrinne et al., "The Session Initiation Protocol: Internet-Centric Signaling," IEEE Communications Magazine, Oct. 2000, vol. 38, No. 10, pp. 134-141.

LOSI, "Instant Messaging for Call Centers Leaves 'Em Smiling," www.CRMDaily.com, Jun. 4, 2001, available at http://www.newsfactor.com/perl/story/10246.html, 3 pages.

Sugano et al., "Common Presence and Instant Messaging (CPIM) Presence Information Data Format," Network Working Group, Dec. 2002, available at http://www.lettorofintemet-drafts/draft-letf-impo-cnim-oidf-07.bct, 26 pages.

The MIT Oxygen Project, Cambridge, MA, Apr. 25-26, 2000, 9 pages.

Walsh, "Instant messaging boosts service at Texas call center" GCN, Nov. 2001, available at http://www.gcn.com/cgi-bin/udt/im.display.printable?client.id=state2&story.id=16765, 2 pages.

Venus Valley, "Live chat for your website," Venus Valley Live Support, 2003, available at http://www.pppindia.com/vvchat/shots.htm>, 2 pages.

News Release, "WiredRed to Provide Secure Instant Messaging for Eight New Call Center Customers," WiredRed Software, Sep. 28, 2002, available at http://www.wiredred.com/news_release_callctr.html, 2 pages.

Bray et al. (eds.), "Namespaces in XML," W3C recommendation: xml-names, Jan. 14, 1999, 12 pages.

Zmolek, "Simple and Presence: Enterprise Value Propositions," Avaya presentation, presented Jan. 24, 2002, 16 pages.

Extended European Search Report for European Patent Application No. 10178240.7, dated Dec. 9, 2010, 5 pages.

Official Action with English translation for Korea Patent Application No. 2010-0092956, dated Dec. 19, 2011 6 pages.

Official Action with English translation for China Patent Application No. 201010546398.0, dated Nov. 23, 2011 9 pages.

Official Action with English translation for Korean Patent Application No. 2010-0092956, dated May 16, 2012 5 pages.

Official Action for Mexico Patent Application No. MX/a/2010/010421, dated May 18, 2012 5 pages.

* cited by examiner

GROUP COMPOSITING ALGORITHMS FOR PRESENCE

BACKGROUND

Business and other organizations often make decisions or conduct activities with groups of people. The groups may be formed from two or more people. For example, the Board of Directors may meet to determine the Chief Executive Officer. The organization and membership of the group can be determined by the rules of the organization. However, it is difficult to determine whether the group is present and properly formed without direct human involvement. Presence systems have helped to automate the determination of whether a person is present or where the person is present. Unfortunately, presence systems do not provide a function for directly determining if groups are present.

SUMMARY

It is with respect to the above issues and other problems that the embodiments presented herein were contemplated. Embodiments of systems and methods presented herein construct groups and determine the presence for the groups. The groups can be constructed based on business logic. A set of components can model a group from the business logic, can establish a membership for the group, can determine one or more rules that govern presence determination for the membership, and can provide the group model, membership information, and the one or more rules to a rules engine. The rules engine can evaluate presence for the group model based on the membership and the one or more rules. The group presence can then be provided to one or more entities, applications, or workflows that subscribe to the rules engine for the group presence.

The embodiments presented herein provide numerous advantages. Group composition within a presence service should model real-world business logic. The embodiments herein provide a set of compositing algorithms that enable group composition or status to be based on any combination of configurable rule primitives. Some example of rule primitives include: a single member is required to represent (i.e., determine presence state or receive communication on behalf of) a given group or subgroup of a composite group; all members of a group are required to represent a given group or subgroup of a composite group; a quorum is required (defined as a whole number or percentage of all defined members) to represent a given group or subgroup of a composite group; a collection of groups or subgroups, as formed using one of the above rules, and that meet a corresponding requirement(s) (e.g., one sub-group, all sub-groups, quorum, etc.) for that group or subgroup; a time-of-day rule that limits presence of a group or subgroup to a defined set of business hours; a geographic location rule that limits presence of a group by geophysical location (e.g. must be in Switzerland); a medium rule that limits presence of a group by medium/channel of communication (e.g. available via telephone); a state limitation rule that limits presence of a group by a predefined state.

In addition, group membership may be automatically constructed and/or updated. For example, the groups can be constructed as follows: via recursion to build groups composed of other groups of heterogeneous types; via attributes derived from an enterprise directory (typically accessed via Lightweight Directory Access Protocol (LDAP)); or via another available mechanism(s) to import state or attributes originating elsewhere. Composition rules and status rules for a given state may be configured differently for each group.

Current technology offers only primitive group composition capabilities, which are inflexible and do not map easily to business logic. The embodiments presented herein allow a more natural mapping to real-world business rules by enabling more sophisticated and flexible composition rules.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or , operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage that participates in providing instructions to a processor for execution. Such a medium may take many forms, including but not limited to, non-volatile media or volatile media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the invention is considered to include a tangible storage medium and prior art-recognized equivalents and successor media, in which the software implementations of the embodiments herein are stored.

The terms "determine", "calculate" and "compute," and variations thereof, as used herein, are used interchangeably and include any type of methodology, process, mathematical operation or technique.

The term "module" or "component" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

The ensuing description provides embodiments only, and is not intended to limit the scope, applicability, or configuration of the invention. Rather, the ensuing description will provide those skilled in the art with an enabling description for implementing the embodiments. It being understood that various changes may be made in the function and arrangement of elements without departing from the spirit and scope of the invention as set forth in the appended claims.

The embodiments described herein determine group presence. A group can be any collection of two or more entities. An entity may be an individual person (i.e., a human being) or another group. The groups are created based on business logic. Business logic is one or more rules defining a membership for a particular task or event. For example, if a corporation is sued for patent infringement, the corporation may need to respond to the suit in a particular way based on state or national laws, based on the corporation's articles of incorporation, the corporation bylaws, corporate policy, or other guidelines. For example, the corporation may require a certain group to meet to respond to the suit. The group membership may comprise the chief executive officer, any three of six members of the Board of Directors, the corporate counsel, and either the chief financial officer or the chief technology officer. To determine if the meeting of the group can be held, the presence of the group needs to be determined from the membership of the group and based on the business logic. As such, the embodiments herein determine the group composition and group presence based on the business logic.

Figure 1:
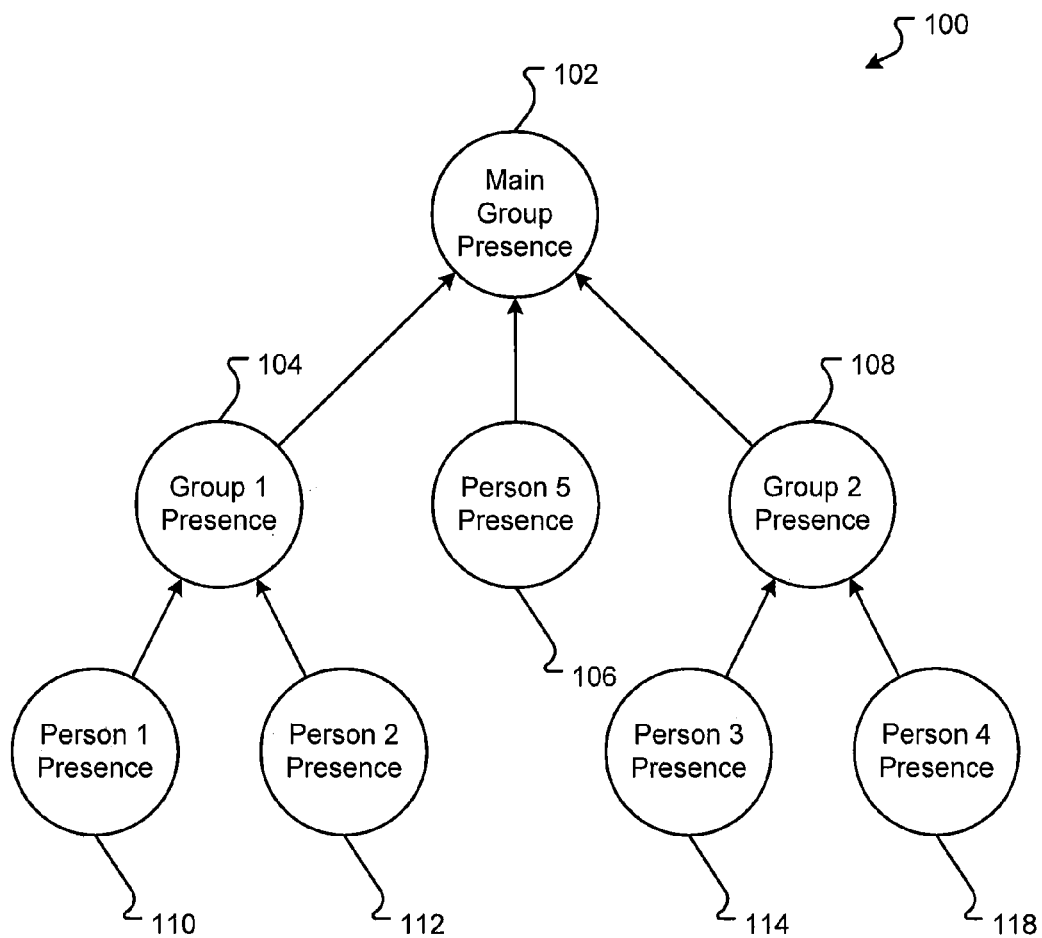
FIG. 1 is a block diagram of an embodiment of a group model that represents the membership, hierarchy, and structure of a group.

An embodiment of a group model 100 (the group model may also be referred to as the group structure or simply as the group) is shown in FIG. 1. This group structure 100 is only one example of various group structures, memberships, and/or hierarchies. The group structure 100 is being provided to explain some concepts or terms referred to hereinafter. A group 100 can comprise two or more nodes 102 through 118. Each node 102 through 118 can represent an individual person, another group, or a sub-group. The group 100 can be arranged in a hierarchy, where a top tier node 102 determines presence for the entire group 100. The top tier node 102 may be referred to as a parent node, grandparent node, great grandparent node, etc., based on the relationship with a lower-tiered node.

Two or more nodes 104 through 118 can comprise one or more sub tiers or lower tiers in the hierarchy. For example, nodes 104 through 108 are on the next lower tier from the top tier node 102. Nodes 104 through 108 are considered child nodes of parent node 102. Nodes 110 through 118 are the next lower tier of nodes. Nodes 110 through 118 are considered grandchild nodes of grandparent node 102 and child nodes of either parent node 104 or parent node 108. FIG. 1 shows a group hierarchy with only three tiers. However, a group hierarchy can have any number of tiers based on the business logic that created the group.

The top tier node 102 receives presence status from the child nodes 104, 106, and 108. The top tier node 102 can have a rule or threshold that determines if the group 100 is present based on the presence status of the child nodes 104, 106, and 108. For example, the threshold may require every child node 104, 106, and 108 to be present. In other embodiments, the threshold may be a percentage (e.g., at least 50% of the child nodes 104, 106, and 108 need to be present). In other embodiments, the threshold is a set number (e.g., at least two of the child nodes 104, 106, and 108 needs to be present). Regardless, the presence status of the top tier node 102, and therefore the group, is based on the presence status of the child nodes 104, 106, and 108 that provide presence status to the top tier node 102.

Presence for the lower tiered nodes 104 through 118 can be determined in a similar fashion. For example, the presence status for node 104 is based upon the presence status of the person 1 in node 110 and person 2 in node 112. At some tier, the presence of the node is based on the presence of one or more individual persons. Thus, the presence status for at least two individual persons is required to determine the status of the group 100. This exemplary group 100 will be referred to hereinafter to describe embodiments of the systems and methods.

Figure 2A:
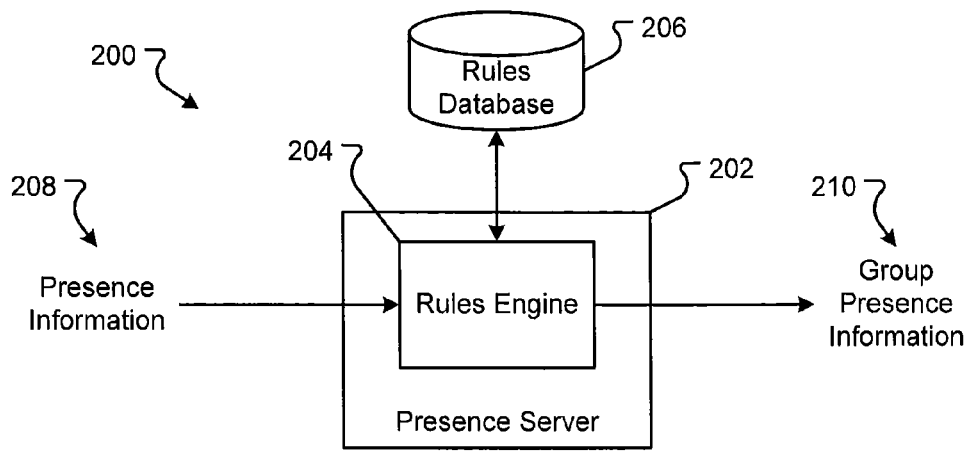
FIGS. 2A, 2B, and 2C are block diagrams of embodiments of systems that can determine group presence.
Figure 2B:
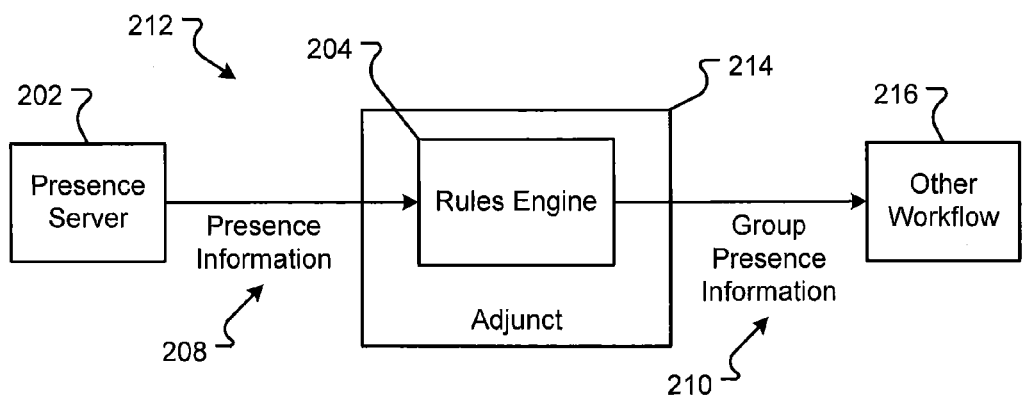
Figure 2C:
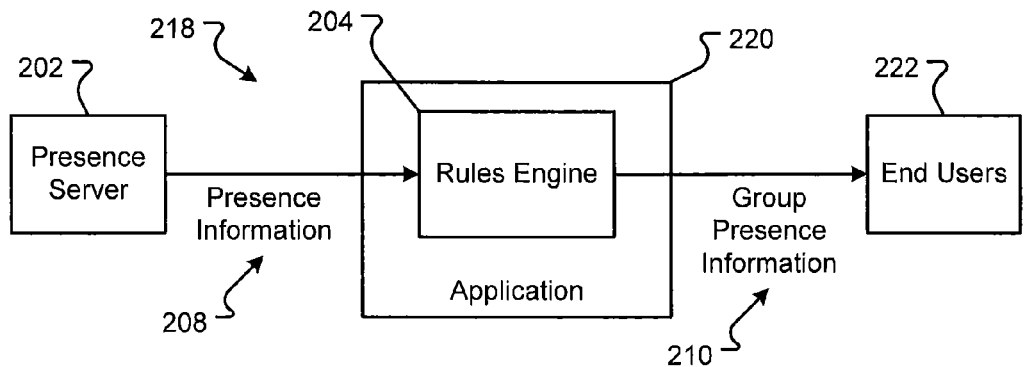

Three embodiments of systems 200, 212, and 218 that are operable to generate groups and determine group presence are shown in FIGS. 2A, 2B, and 2C, respectively. The systems 200, 212, and 218 include common components or modules. The components in systems 200, 212, and 218 can be hardware, software, or a combination of hardware and software. In embodiments, the servers or computer systems described in conjunction with FIGS. 2A, 2B, and 2C are as described in conjunction with FIGS. 7 and 8. The servers and functions described in conjunction with FIGS. 2A, 2B, and 2C may also be software applications executing on one or more servers or computer systems that are described in conjunction with FIGS. 7 and 8. Further, the components described herein may be in communication with each other. The components can communicate through any known system or protocol, some of which are described in conjunction with FIGS. 7 and 8.

In embodiments, the systems 200, 212, and 218 comprise a presence server 202 operable to determine a presence status for two or more individual persons. The presence server 202 may determine presence for the two or more individuals through any known means. For example, the presence server 202 can determine presence as described in U.S. Pat. No. 7,171,473, entitled "System using HTTP protocol for maintaining and updating on-line presence information of new user in user table and group table," issued Jan. 30, 2007, and U.S. Patent Publication No. 20070067443, entitled "Presence-based hybrid peer-to-peer communications," filed Sep. 30, 2005, which are both incorporated herein in their entirety for all that the patents teach. Presence information and the determination of presence is further, described in the Network Working Group Request for Comments: 2778, authored by M. Day, J. Rosenberg, and H. Sugano, published by the Internet Engineering Task Force on Feb. 2000, and entitled "A Model for Presence and Instant Messaging," which is incorporated herein in the document's entirety for all that the document teaches. The presence server 202 can provide the presence status for the two or more individual persons as presence information 208. In other embodiments, the presence server 202 may also provide group presence information 210 for a first group to facilitate the determination of presence for a second group.

A rules database 206 can be any database server, system, or application operable to store and provide data or information. The rules database 206 may store group rules, business logic, group models 100, etc. for the rules engine 204. Thus, depending on the group or event triggering the need for group presence information, the rules engine 204 can search and retrieve information from the rules database 206 to help determine the group presence.

The systems 200, 212, and 218 can also include a rules engine 204. The rules engine 204 may be an application or device that determines presence for a group. In other words, the rules engine 204 is operable to receive the presence information 208, operable to determine the group presence based on the presence information 208, and operable to publish the group presence as group presence information 210. The rules engine 204 can determine the group presence based on the rules created from business logic that created the group model 100.

In embodiments, the rules engine 204 can execute on the presence server 202 as shown in FIG. 2A. In other embodiments, the system 212 includes an adjunct 214. The adjunct 214 may be a separate server or separate application from the presence server 202 that determines group presence. Thus, the presence server 202 sends presence information 208 for individuals to the adjunct 214 where the rules engine 204, executing on the adjunct 214, determines group presence and publishes group presence information 210. The group presence information 210 may be sent to other workflows 216. The other workflows 216 can be other adjuncts, the presence server 202, another presence server, applications, end users, etc.

The system 218 may also include an application 220. The application 220 can be any software application that uses group presence information. In embodiments, the application 220 executes the rules engine 204. Thus, the presence server 202 sends presence information 208 for individuals or sub-groups to the application 220 where the rules engine 204, executing on the application 220, determines group presence and publishes group presence information 210. The, group presence information 210 may be sent to one or more end users 222. Thus, each application 220 interested in a predetermined group or groups can determine presence separately. In other words, group presence is determined in a distributed fashion among two or more applications 220.

Figure 3:
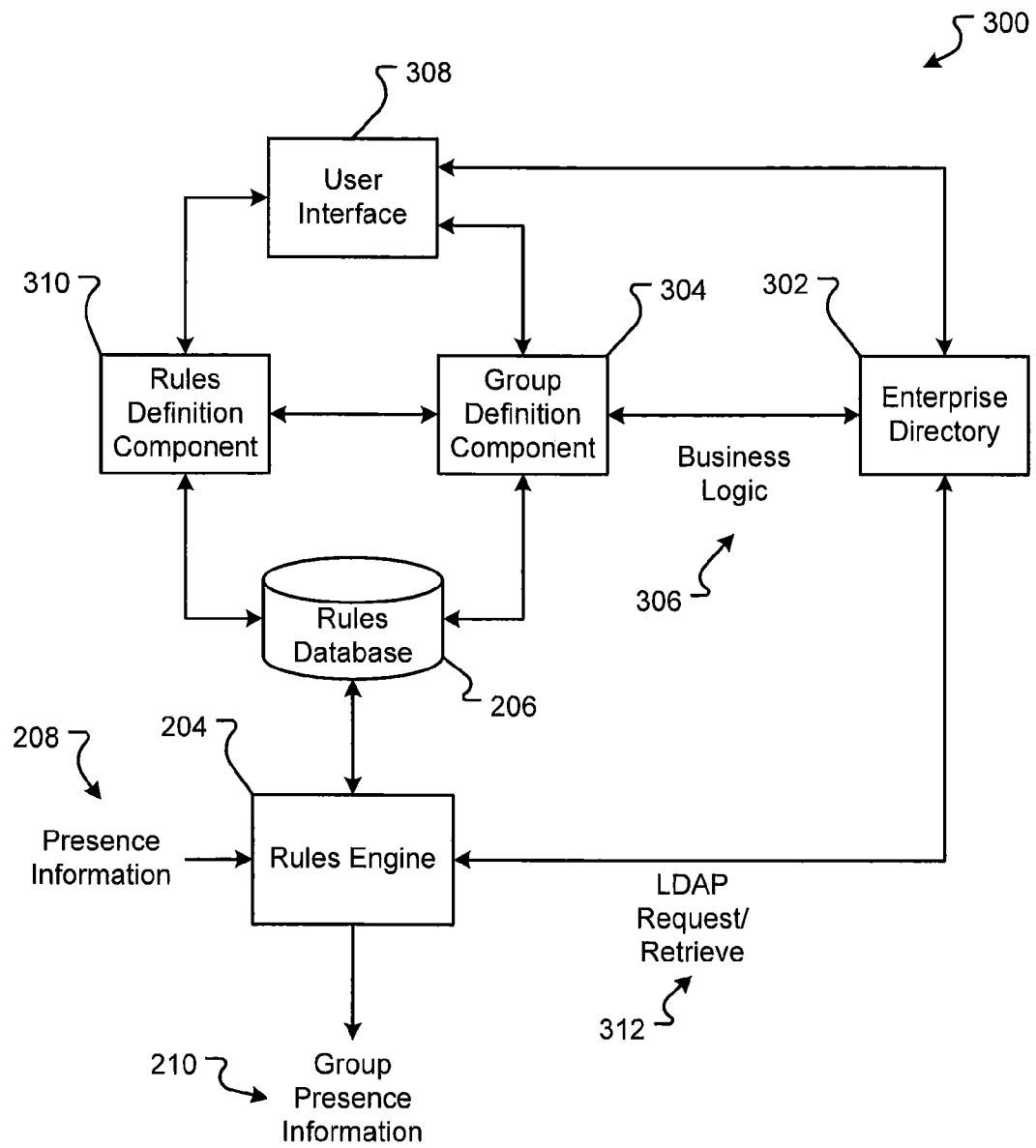
FIG. 3 is a block diagram of an embodiment of a system for creating group models and group rules that are used to determine group presence.

A further system 300 operable to generate group presence models 100 and rules and operable to help the rules engine 204 determine group presence is shown in FIG. 3. The components in system 300 can be hardware, software, or a combination of hardware and software. In embodiments, the components described in conjunction with FIG. 3 are computer systems or servers as described in conjunction with FIGS. 7 and 8. The components and functions described in conjunction with FIG. 3 may also be software applications executing on one or more servers or computer systems that are described in conjunction with FIGS. 7 and 8. Further, the components described herein may be in communication with each other. The components can communicate through any known system or protocol, some of which are described in conjunction with FIGS. 7 and 8.

The system 300 can include the rules database 206, which is operable to store the rules for the group, an enterprise directory 302 operable to provide business logic 306 to define the rules, a group definition component 304 operable to define the group model 100 based on the business logic 306 or rules, and a rules definition component 310 operable to define rules based the group model 100 or the business logic 306. The enterprise directory 302, the group definition component 304, and the rules definition component 310 help define the information required for the rules engine 204 to determine group presence. The information is then stored in the rules database 206.

The enterprise directory 302 can be an LDAP database that stores information about the two or more individual persons. The stored information can include metadata or attributes about the people in an organization. For example, attributes can include an identifier for the person (e.g., name, employee identifier, social security identifier, etc.), a position identifier (e.g., position title, position number, etc.), where the person is located (e.g., office name, network address, address, etc.), how long the person has worked with the company, the contact information for the person (e.g., phone number(s), email address(es), mail address(es), etc.), salary, etc. These attributes can be used to form the groups. For example, a group can comprise, three of five executive members. Rather than list the executive members by name or personal identifier, the group can list a predetermined position identifier that designates the several people as executive members. Other attributes can be used in a similar fashion to form groups. When the rules engine 204 is determining the presence for a group with members identified by attributes, the rules engine 204 can send an LDAP (or similar) request 312 to the enterprise directory 302 to retrieve the personal identities for the two or more individual persons associated with the attributes that define the membership of the group. For example, the rules engine 204 requests the names or identifiers for the members of the executive committee that form the group described above. In this way, the rules engine 204 can determine what presence information 208 is pertinent to the group presence determination.

The enterprise directory 302 can also include the business logic 306 used to form the groups. The business logic 306 can include who should by in particular groups, how those groups should meet or communicate (e.g., in person, by video conference, by email), when those groups can or should meet, where those groups should meet, etc. The business logic 306 is sent to the group definition component 304 and/or rules definition component 310 to define the group model 100 and the rules associated with determining the presence for the group.

The group definition component 304 defines the group model 100 from the business logic 306. For example, if a group comprises two individual persons and two sub-groups, the group definition component 304 creates a model 100 with four nodes, two nodes for the two individual persons and two nodes for the two sub-groups. Further, the group definition component 304 then defines the membership and nodes that are children to the sub-group nodes. The group definition component 304 creates the nodes in the group model 100 and arranges the interrelationships between the nodes. The group model 100 is then sent to and stored by the rules database 206.

Similar to the group definition component 304, the rules definition component 310 determines the rules associated with each node in the group model 100 based on the business logic 306. For example, the rules definition component 310 creates a threshold rule for the membership of a node. The threshold is determined by one or more algorithms and determines how presence is determined. For example, a threshold rule can be met when at least one individual of two or more individuals in the membership is present; all individuals in the membership are present; a predetermined percentage of all individuals in the membership are present; and a predetermined number of individuals of all individuals in the membership are present. Other threshold rules may be possible.

The rules definition component 310 may also have rules that limit or change how presence is determined. For example, the rules definition component 310 can create a time-of-day rule that limits presence determination of a group or a node based on the time of day (e.g., presence is only found during business hours); a geographic location rule that limits presence determination for a group or a node based on geophysical location (e.g., presence is only found when the members are at a predetermined office location); a medium rule that limits presence determination for a group or a node based on the medium or channel of communication available (e.g., presence is only found when all members can call into a teleconference); or a state limitation rule that limits presence determination for a group or a node based on a state (e.g., presence is only found if the members are working and not on vacation). These rules can be applied to the group model in general 100 or to one or more nodes within the group model 100.

Figure 8:
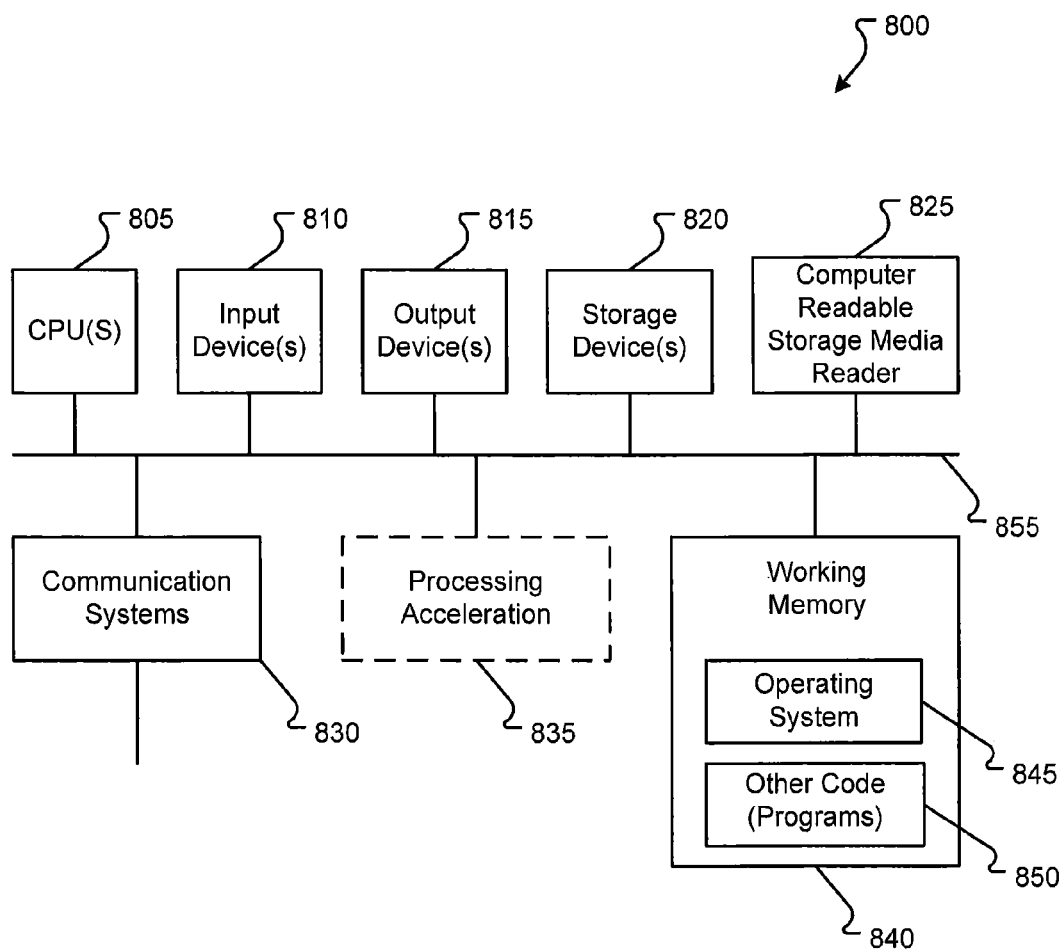
FIG. 8 is a block diagram of a computer system in which the systems and methods may be executed.

The user interface 308 can be any user interface as described in conjunction with FIG. 8. A user may wish to create the groups or manage the groups. To modify or create groups and rules, a user interfaces with the group definition component 304, the enterprise directory 302, and/or rules definition component 310 through the user interface 308. Thus, the user can create custom groups or rules not dictated by the business logic 306 alone.

Figure 4A:
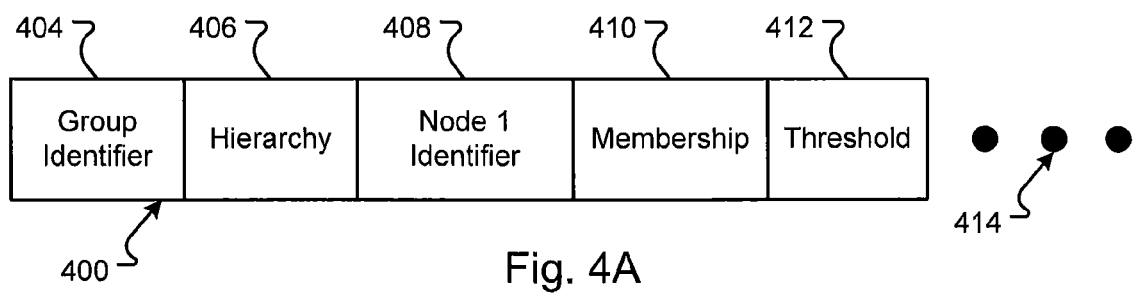
FIGS. 4A and 4B are block diagrams of embodiments of data structures that may be stored, sent, or received by one or more computer systems and represent a group definition and a node definition.
Figure 4B:
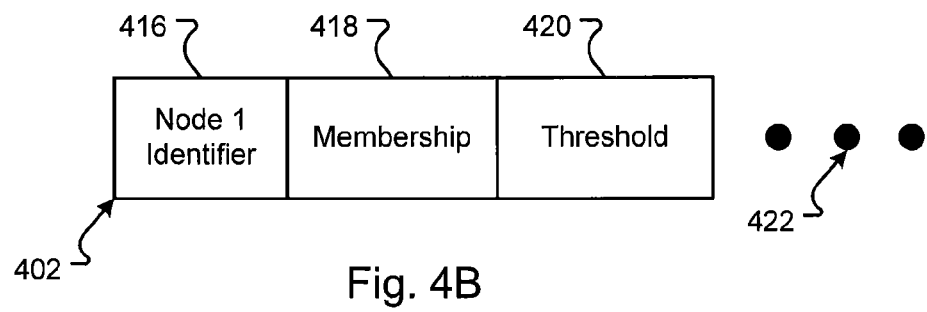

Embodiments of data structures 400 and 402 that may be stored by the rules database 206 and retrieved by the rules engine 204 to determine group presence are shown in FIGS. 4A and 4B. The data structures 400 and 402 can be saved in any database system or data storage system or protocol. Further, the data structures 400 and 402 may be created by either the group definition component 304 and/or the rules definition component 310. In embodiments, the data structure 400 is a group definition. The group definition 400 can include a group identifier data field 404, a hierarchy data field 406, at least one node identifier data field 408, a membership data field 410, and a threshold data field 412. The group definition 400 can include more or fewer data fields than those shown in FIG. 4A, as represented by the ellipses 414.

The group identifier data field 404 includes at least one identifier (e.g., a globally unique identifier (GUID)) that can be used to identify the group. The group identifier 404 may be used to publish the presence determination for the group. Thus, applications or other work flows that are interested in the group presence can subscribe to receive the presence information, associated with the group identifier 404. A hierarchy data field 406 can define the hierarchy arrangement for the group. In embodiments, the hierarchy definition 406 can identify a top node and/or one or more nodes at each subsequent tier of the hierarchy. The identification may be done by using a node identifier and a number or symbol for the tier to which the node is assigned. Further, the hierarchy 406 can define the interrelationships between the nodes. In other words, the hierarchy 406 can list a node identifier(s) for any associated children or parent nodes associated with the node.

The node identifier(s) 408 can identify the two or more nodes associated with the group. The node identifiers 408 can be any type of identifier or a pointer to a node data structure 402. The membership data field 410 can include membership information for the group. The membership information 410 can include one or more individual persons that may be a member of the group 400 but not part of a sub-group. Further, the membership information 410 may include the rules defining members, such as those rules described in conjunction with FIG. 3. The threshold data field 412 can include the rule(s) used to determine when the group is present. The threshold 412 can include one or more rules, such as those described in conjunction with FIG. 3.

A node definition data structure 402 is shown in FIG. 4B. The node definition 402 can include a node identifier data field 416, a membership data field 418, and a threshold data filed 420. The node definition 402 can include more or fewer data fields than those shown in FIG. 4B, as represented by the ellipses 422. The node identifier 416 can identify the node. The node identifier 416 can be any type of identifier (e.g. a GUID) or a link to another node definition 402 or a group definition 400. The membership data field 418, as with the group definition 400, can include the membership information for the node. The membership information 418 can include node identifiers and/or identifiers for one or more individual persons or sub-groups that are members of the node. Further, the membership information 418 may include the rules defining members, such as those rules described in conjunction with FIG. 3. The threshold data field 420 can include the rule(s) used to determine when the node membership is present. The threshold 420 can include rules such as those described in conjunction with FIG. 3.

Figure 5:
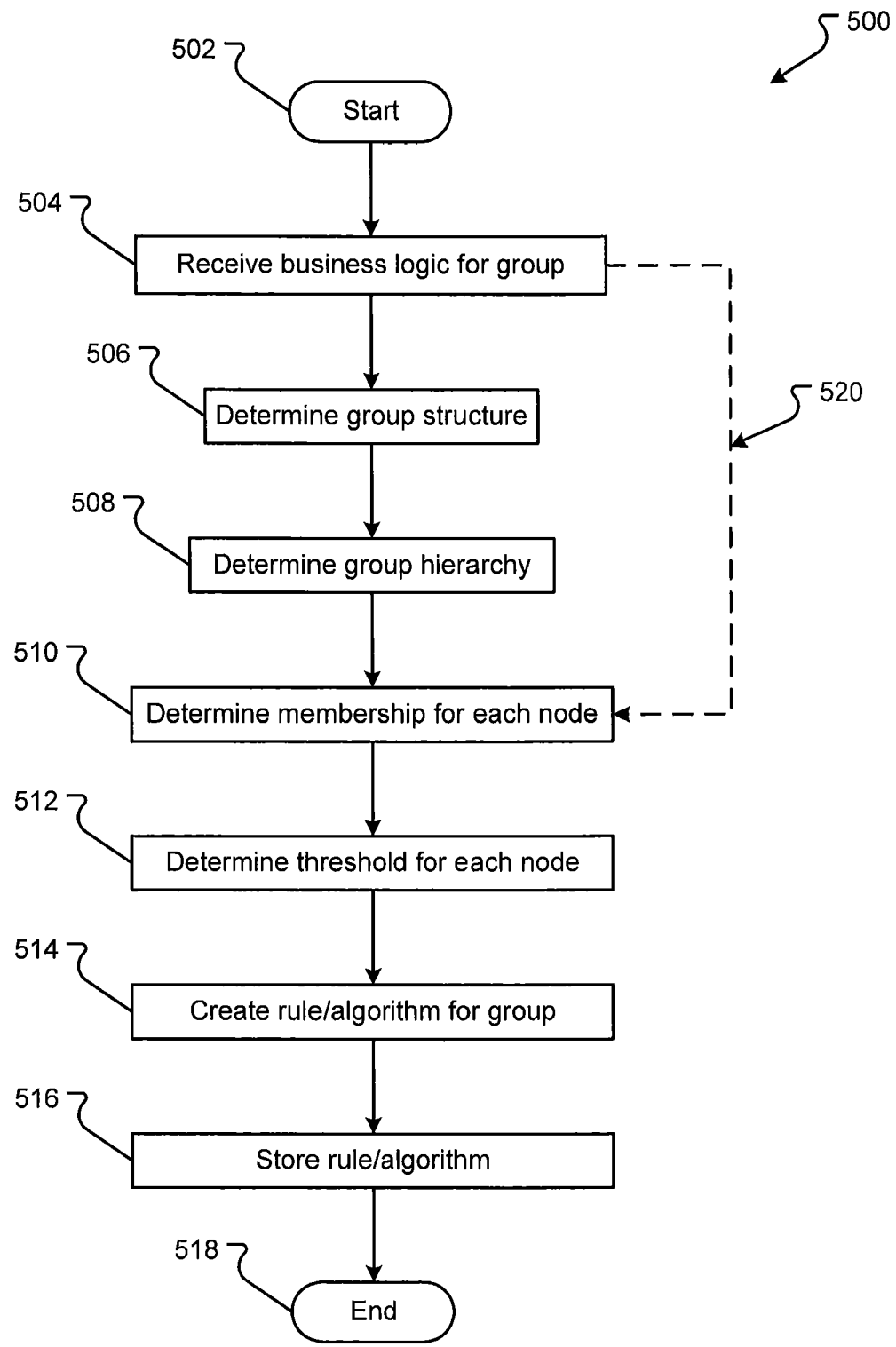
FIG. 5 is a flow diagram of an embodiment of a process for creating a group model and/or rule(s) for determining group presence.

An embodiment of a method 500 for generating a group/rule definition is shown in FIG. 5. Generally, the method 500 begins with a start operation 502 and terminates with an end operation 518. While a general order for the steps of the method 500 are shown in FIG. 5, the method 500 can include more or fewer steps or arrange the order of the steps differently than those shown in FIG. 5. The method 500 can be executed as a set of computer-executable instructions executed by a computer system and encoded or stored on a computer readable medium. Hereinafter, the method 500 shall be explained with reference to the systems, components, modules, software, data structures, etc. described in conjunction with FIGS. 1 through 4B.

A group definition component 304 and/or a rules definition component 310 can receive business logic 310 from the enterprise directory 302 in step 504. The business logic 306 defines the membership of a group and/or the rules that govern the membership of the group. A user may initiate the creation of the group by sending a signal though a user interface 308 to the group definition component 304, the rules definition component 310, and/or the enterprise directory 302. In other embodiments, a group is automatically created in response to the creation of or modification of business logic 306 in the enterprise directory 302. In other words, the enterprise directory 302 automatically pushes changes to business logic 306 to the group definition component 304 or the rules definition component 310 to create or modify a group.

The group definition component 304 determines a structure for the group based on the business logic 306 in step 506. The group definition component 304 can create the group model 100 based on the business logic 306 as explained in conjunction with FIG. 3. Generally, the group structure 100 can comprise a hierarchy having two or more nodes. Thus, the group definition component 304 can create a group definition 400 and/or one or more node definitions 402 to create the group model 100. The business logic 306 may define the number of and content of the group definition 400 and/or one or more node definitions 402, as explained in conjunction with FIGS. 4A and 4B. Further, the group definition component 304 can determine the hierarchy of the group based on the business logic 306 in step 508. The business logic 306 can define what individuals and/or sub-groups 104 and 108 form the main group 102 or other sub-groups. Thus, the membership of the group 100 can be a collection of other groups or sub-groups and/or individual persons. The group definition component 304 may then incorporate node identifiers 408 and/or a hierarchy definition 406 in the group definition 400 and any node definitions 402. In embodiments, some groups have only individuals and the process optionally proceeds from step 504 to step 510 by path 520.

The rules definition component 310 can determine a membership for each of the two or more nodes 102 through 118 in step 510. The rules definition component 310 can determine, from the business logic, the attribute or identity identifying each individual person that is a member of each node and derive the attributes or identities from the enterprise directory 302. For example, if three executive members are required for the group, the rules definition component 310 either determines the position identifier for the executive members or the employee identifiers for the current executive members. The attributes or identities can be stored in the membership field 410 or 418 for the group or node.

Further, the rules definition component 310 can determine a threshold for each of the two or more nodes in the group in step 512. The threshold defines if the membership of the node is present. The threshold can be defined by the business logic 306 and can include a rule(s), as described in conjunction with FIG. 3. The rule(s) governing group composition and membership are then created in step 514 and stored in the threshold field 412 or 420 in step 516. In embodiments, the rules definition component 310 can also define a rule, such as the rules described in conjunction with FIG. 3, limiting how presence will be determined. These rules or algorithms define group presence and are based on the business logic 306. Thus, the rules change if the business logic 306 changes.

Figure 6:
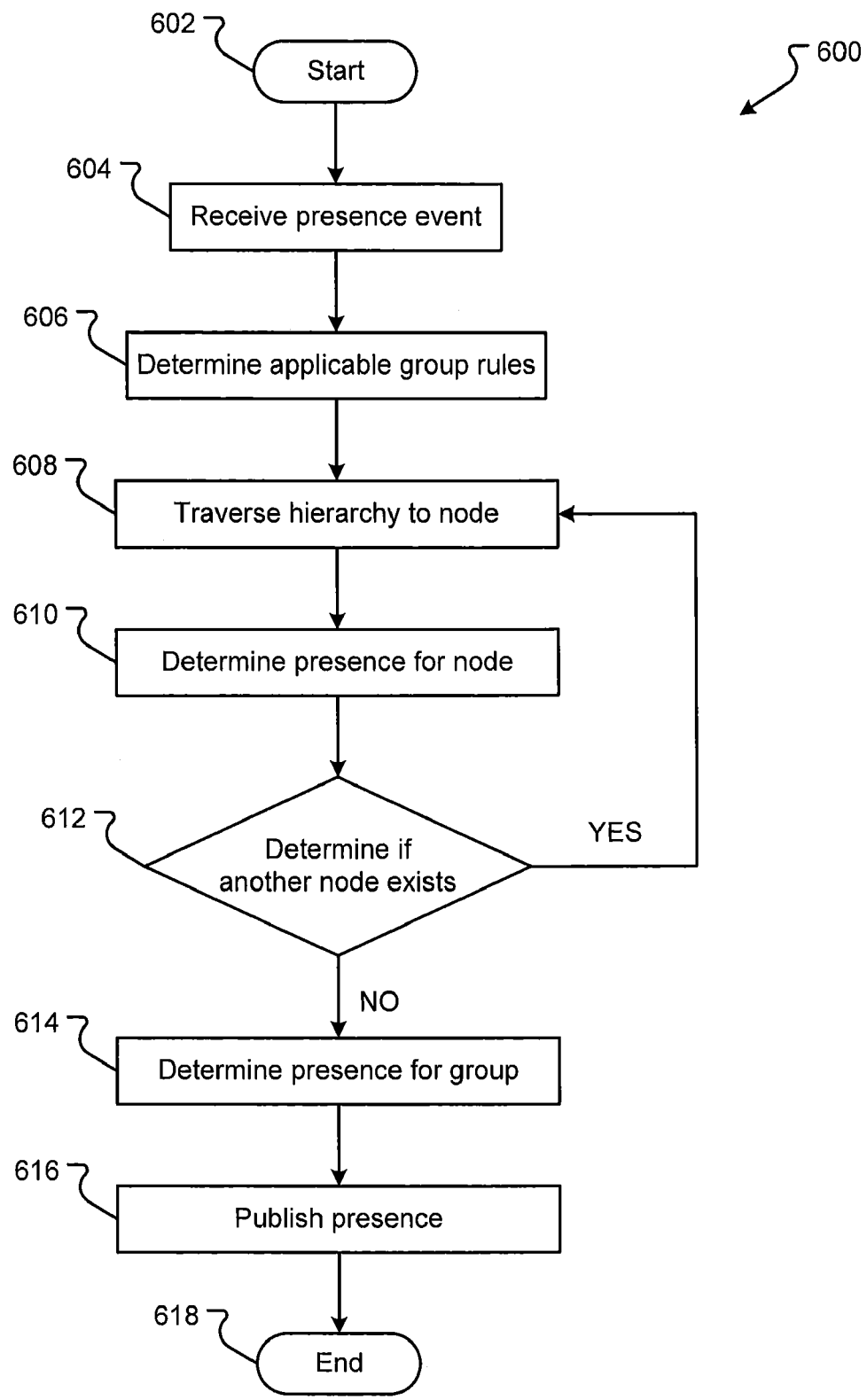
FIG. 6 is a flow diagram of an embodiment of a process for determining group presence.

An embodiment of a method 600 for determining group presence is shown in FIG. 6. Generally, the method 600 begins with a start operation 602 and terminates with an end operation 618. While a general order for the steps of the method 600 are shown in FIG. 6, the method 600 can include more or fewer steps or arrange the order of the steps differently than those shown in FIG. 6. The method 600 can be executed as a set of computer-executable instructions executed by a computer system and encoded or stored on a computer readable medium. Hereinafter, the method 600 shall be explained with reference to the systems, components, modules, software, data structures, etc. described in conjunction with FIGS. 1-4B.

The rules engine 204 receives a presence event in step 604. The presence event can be a change in a presence status for an individual person, a change to a business objective that defines the group rule, a change in a membership of a node (e.g., a new executive member is hired for a group defined by the executive member identifier), a change to the hierarchy of the group, a change to a node in the group, etc. In other words, a presence event can be any change that may affect presence of a group. For example, a presence event can be a change to the presence status of a sub-group, individual person, or other entity that is part of the membership of the group. Further, a presence event can be a change in the business logic that changes the group structure or group rules or the creation of a new group. The rules engine 204 may be alerted of the presence event by subscribing to the presence server 202 for presence status on two or more individuals. If a change to the presence status occurs, the presences server 202 sends the new presence status to the rules engine 204. In embodiments, an enterprise server 302, rules database 206, group definition component 304, and/or rules definition component 310 can send a signal to the rules engine 204 notifying of a change to a group or rule definition based on a change to the business logic 306.

The rules engine 204 may then determine the applicable rule(s) for the group(s) affected by the presence event in step 606. In embodiments, the change in presence status is identified with a group identifier(s) 404. The rules engine 204 can send a database search to the rules database 206 for the group identifier(s) 404. The rules database 206 can return the group definition(s) 400 and one or more node definitions 402. Generally, the group 100 will have two or more nodes. After receiving the group definition 400 and one or more node definitions 402, the rules engine 204 can use the group model 100 defined in group definition 400 and one or more node definitions 402 to determine group presence.

To determine the group presence, the rules engine 204 may traverse the hierarchy associated with the group model 100 to a node 110 in step 608. In embodiments, the rules engine 204 traverses the hierarchy 110, 112, 114, or 118 to the lowest node in the group model 100. To traverse the hierarchy, the rules engine 204 can interpret the hierarchy information 406 to determine the node definition 402 of the lowest node. In other embodiments, the rules engine 204 can follow the pointer or identifier in each node identifier field 408 to a node definition 402. At the node definition 416, the rules engine 204 may determine if the node has a child and follow a pointer or identifier to the child node. The process can continue until the rules engine 204 reaches a node without a pointer or identifier to another node.

After traversing the hierarchy to a node, the rules engine 204 can determine the presence for the node in step 610. Generally, the rules engine 204 determines presence of the node based on the membership 418 for the node and the threshold rule(s) 420. The membership 418 can include two or more individual persons or groups, and the threshold is determined by a rule(s) that defines when the membership 418 of the node is present. Typically, the lowest nodes represent individual persons, such as nodes 110, 112, 114, and 118. Thus, at the lowest nodes, the node is associated with the presence of at least one individual person, and the rules engine 204 receives presence information for the individual persons from the presence server 202 to determine the presence status for the nodes.

In some embodiments, the individual person(s) associated with the node are represented by or based on at least one attribute of an individual person as stored in an enterprise directory 302. In this situation, the rules engine 204 may send an LDAP query to the enterprise directory 302 to retrieve an identity or identifier for the one or more individual persons having the attribute from the enterprise directory to determine the presence for the node. Then, the rules engine 204 can request presence information 208 from the presence server 202 for the identified person. If the node is a parent node, the presence is determined by the presence status of the children node. In other words, the node is associated with the presence of a sub-group, wherein the sub-group may include two or more individual persons. In each instance, the rules engine 204 retrieves the membership information 418 for the node and applies the threshold rule(s) and other rule(s) stored in the threshold data field 420 for the node definition 402.

The rules engine 204 then starts to iterate the process of determining presence status for the node(s) in the group. The rules engine 204 determines if another node exists in the group model 100 in step 612. Here, after determining the status of the node, the rules engine 204 determines if the node is a child of another node. To determine if the node is a child, the rules engine 204 can determine if another node has the node identifier 416 of the present node in a node identifier field 408. In other embodiments, the node definition 402 includes an identifier for the one or more parent nodes associated with the child node. If there is another node in the group model 100, the method 600 flows YES back to step 608 to traverse the hierarchy to the other node and determine the other nodes presence status in step 610. By continuing to traverse up the group model 100 from the one or more lowest nodes, the rules engine 204 can determine the status for each sub-group and finally for the group node 102. If there is no other node in the group model 100, the method 600 flows NO to step 614.

After all the nodes for the sub-groups and individual persons have been determined, the rules engine 204 can then determine a presence for the group based on the presence for the two or more lower level nodes in step 614. Here, the rules engine 204 determines the membership and the threshold rule(s) for the group. Using the determined status of the lower level nodes, the rules engine 204 applies the threshold rules to determine the presence of the group. Then, the rules engine 204 can publish the group presence 210, in step 616, to other workflows 216, applications 220, end users 22, or other interested parties or entities. Here, workflows 216, applications 220, end users 22, or other interested parties or entities subscribe to receive the group presence 210. The rules engine 204 sends the group presence 210 to the subscribers.

Figure 7:
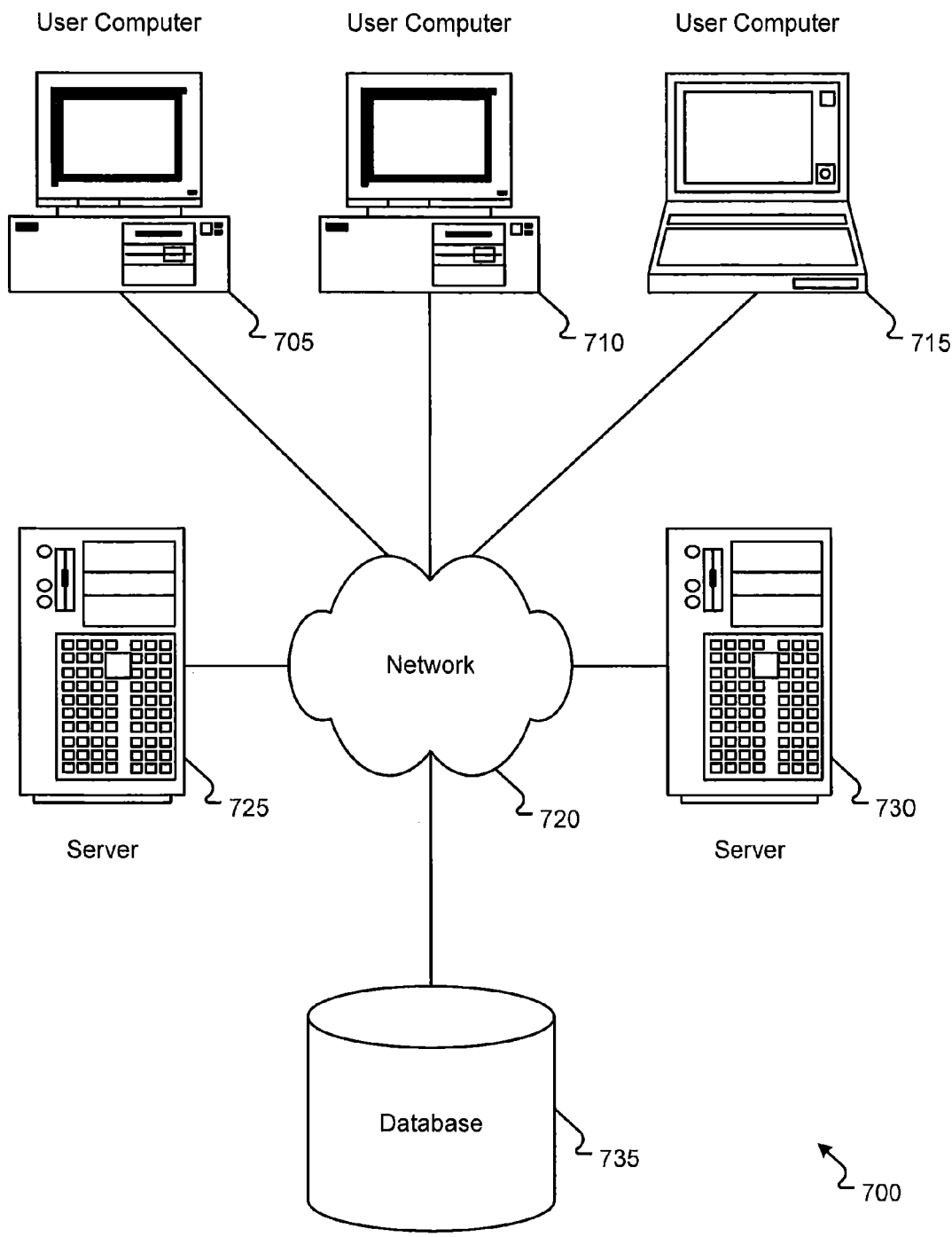
FIG. 7 is a block diagram of an embodiment of a computer system environment in which the systems and methods may be executed.

FIG. 7 illustrates a block diagram of a computing environment 700 that may include the systems 200, 212, 218, or 300, or other systems described herein. The system 700 includes one or more computers 705, 710, and 715. The computers 705, 710, and 715 may be general purpose personal computers (including, merely by way of example, personal computers and/or laptop computers running various versions of Microsoft Corp.'s Windows® and/or Apple Corp.'s Macintosh® operating systems) and/or workstation computers running any of a variety of commercially-available UNIX® or UNIX-like operating systems. These computers 705, 710, 715 may also have any of a variety of applications, including for example, database clients, server applications, and/or web browser applications. Alternatively, the computers 705, 710, and 715 may be any other electronic device, such as a thin-client computer, mobile telephone, mobile device, Internet-enabled mobile telephone, and/or personal digital assistant, capable of communicating via a network (e.g., the network 720 described below) and/or displaying and navigating other types of electronic data. Although the exemplary system 700 is shown with three computers, any number of computers may be supported.

System 700 further includes a network 720. The network 720 may can be any type of network familiar to those skilled in the art that can support data communications using any of a variety of commercially-available protocols, including without limitation TCP/IP, SNA, IPX, AppleTalk, and the like. Merely by way of example, the network 720 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 702.11 suite of protocols, the Bluetooth® protocol known in the art, and/or any other wireless protocol); and/or any combination of these and/or other networks. The network 720 may be the same or similar to networks allowing communication between the various systems and components described herein.

The system 700 may also include one or more server computers 725 and 730. The server computers 725 and/or 730 can represent any of the systems 200, 212, 218, 300, or other systems described herein. One server may be a web server 725, which may be used to process requests for web pages or other electronic documents from user computers 705, 710, and 720. The web server can be running an operating system including any of those discussed above, as well as any commercially-available server operating systems. The web server 725 can also run a variety of server applications, including HTTP servers, FTP servers, CGI servers, database servers, Java servers, and the like. In some instances, the web server 725 may publish operations available operations as one or more web services.

The system 700 may also include one or more file and or/application servers 730, which can, in addition to an operating system, include one or more applications accessible by a client running on one or more of the user computers 705, 710, 715. The server(s) 730 may be one or more general purpose computers capable of executing programs or scripts in response to the user computers 705, 710 and 715. As one example, the server may execute one or more web applications. The web application may be implemented as one or more scripts or programs written in any programming language, such as Java™, C, C#® or C++, and/or any scripting language, such as Perl, Python, or TCL, as well as combinations of any programming/scripting languages. The application server(s) 730 may also include database servers, including without limitation those commercially available from Oracle, Microsoft, Sybase™, IBM™ and the like, which can process requests from database clients running on a user computer 705.

The web pages created by the web application server 730 may be forwarded to a user computer 705 via a web server 725. Similarly, the web server 725 may be able to receive web page requests, web services invocations, and/or input data from a user computer 705 and can forward the web page requests and/or input data to the web application server 730. In further embodiments, the server 730 may function as a file server. Although for ease of description, FIG. 7 illustrates a separate web server 725 and file/application server 730, those skilled in the art will recognize that the functions described with respect to servers 725, 730 may be performed by a single server and/or a plurality of specialized servers, depending on implementation-specific needs and parameters.

The system 700 may also include a database 735, which may be the same or similar to database 206. The database 735 may reside in a variety of locations. By way of example, database 735 may reside on a storage medium local to (and/or resident in) one or more of the computers 705, 710, 715, 725, 730. Alternatively, it may be remote from any or all of the computers 705, 710, 715, 725, 730, and in communication (e.g., via the network 720) with one or more of these. In a particular set of embodiments, the database 735 may reside in a storage-area network ("SAN") familiar to those skilled in the art. Similarly, any necessary files for performing the functions attributed to the computers 705, 710, 715, 725, 730 may be stored locally on the respective computer and/or remotely, as appropriate. In one set of embodiments, the database 735 may be a relational database, such as Oracle 10i®, that is adapted to store, update, and retrieve data in response to SQL-formatted commands. The database 735 may be operable to store data structures 400 and 402.

FIG. 8 illustrates one embodiment of a computer system 800 upon which systems 200, 212, 218, 300, or other systems described herein may be deployed or executed. The computer system 800 is shown comprising hardware elements that may be electrically coupled via a bus 855. The hardware elements may include one or more central processing units (CPUs) 805; one or more input devices 810 (e.g., a mouse, a keyboard, etc.); and one or more output devices 815 (e.g., a display device, a printer, etc.). The computer system 800 may also include one or more storage devices 820. By way of example, storage device(s) 820 may be disk drives, optical storage devices, solid-state storage devices, such as a random access memory ("RAM") and/or a read-only memory ("ROM"), which can be programmable, flash-updateable, and/or the like.

The computer system 800 may additionally include a computer-readable storage media reader 825; a communications system 830 (e.g., a modem, a network card (wireless or wired), an infra-red communication device, etc.); and working memory 840, which may include RAM and ROM devices as described above. In some embodiments, the computer system 800 may also include a processing acceleration unit 835, which can include a DSP, a special-purpose processor and/or the like.

The computer-readable storage media reader 825 can further be connected to a computer-readable storage medium, together (and, optionally, in combination with storage device(s) 820) comprehensively representing remote, local, fixed, and/or removable storage devices plus storage media for temporarily and/or more permanently containing computer-readable information. The communications system 830 may permit data to be exchanged with the network 820 and/or any other computer described above with respect to the system 800. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices, and/or other machine readable mediums for storing information.

The computer system 800 may also comprise software elements, shown as being currently located within a working memory 840, including an operating system 845 and/or other code 850, such as program code implementing the components and software described herein. It should be appreciated that alternate embodiments of a computer system 800 may have numerous variations from that described above. For example, customized hardware might also be used and/or particular elements might be implemented in hardware, software (including portable software, such as applets), or both. Further, connection to other computing devices such as network input/output devices may be employed.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as a storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to or in communication with another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the invention have been described in detail herein, it is to be understood that the inventive concepts may be otherwise variously embodied and employed, and that the appended claims are intended to be construed to include such variations, except as limited by the prior art.

What is claimed is:

1. A method for determining group presence, the method comprising:
   a processor receiving a presence event;
   in response to receiving of the presence event, the processor determining a hierarchy associated with the presence event, wherein the hierarchy is associated with a group having two or more nodes;
   the processor traversing the hierarchy associated with the group to a selected one of the nodes;
   the processor determining a presence for the selected node;
   the processor determining if another node in the hierarchy exists for the group;
   if another node exists for the group, determining a presence for the other node;

if another node in the hierarchy does not exist for the group, determining a presence for the group based on the presence for the nodes in the hierarchy; and the processor publishing the group presence.

2. The method as defined in claim 1, wherein the node is associated with the presence of an individual person.

3. The method as defined in claim 1, wherein the node is associated with the presence of a sub-group, wherein the sub-group includes two or more individual persons.

4. The method as defined in claim 1, wherein the presence of the node is determined based on a membership for the node and a threshold.

5. The method as defined in claim 4, wherein the membership includes two or more individual persons, and wherein the threshold is determined by a rule that defines when the membership of the node is present.

6. The method as defined in claim 4, wherein the membership in the node is based on at least one attribute of an individual person as stored in an enterprise directory.

7. The method as defined in claim 6, wherein the processor retrieves an identity of an individual person having the attribute from the enterprise directory to determine the presence for the node.

8. The method as defined in claim 1, wherein the presence event is one of a group comprising a change in a presence status for an individual person, a change to a business objective that defines the group rule, a change in a membership of a node, a change to the hierarchy of the group, and a change to a node in the group.

9. A system comprising:
a presence server, the presence server operable to determine a presence status for two or more individual persons associated with a group and operable to provide the presence status as individual presence information;
a rules engine in communication with the presence server, the rules engine operable to receive the individual presence information for each of the two or more individual persons, operable to determine a group presence based on the received individual presence information, and operable to publish the group presence, wherein the rules engine determines the group presence based on a rule created from a business logic;
a rules database in communication with the rules engine, the rules database operable to store the rule;
an enterprise directory, the enterprise directory operable to provide the business logic;
a group definition component in communication with the rules database, the group definition component operable to define the group based on the business logic; and
a rules definition component in communication with the rules database and the group definition component, the rules definition component operable to define the rule based on at least one of the group and the business logic.

10. The system as defined in claim 9, wherein the rules engine executes on the presence server.

11. The system as defined in claim 9, wherein the group definition component creates a group definition data structure, the group definition data structure comprising at least one of:
a group identifier;
a hierarchy definition for the group, wherein the hierarchy includes two or more nodes;
two or more identifiers for the two or more nodes;
a membership for the group; and
a threshold for the group, wherein the threshold defines when the membership of the group is present.

12. The system as defined in claim 9, wherein the rules definition component creates a node definition data structure, the node definition data structure comprising at least one of:
a node identifier;
a membership for the node; and
a threshold for the node, wherein the threshold defines when the membership of the node is present.

13. The system as defined in claim 9, further comprising an LDAP database in communication with the rules engine, the LDAP database operable to store information about the two or more individual persons, wherein the information comprises attributes associated with the two or more individual persons, wherein the rules engine retrieves identities for the two or more individual persons based on attributes associated with the membership of the group.

14. A computer program product comprising computer executable instructions stored onto a non-transitory computer readable medium which, when executed by a processor of a computer, causes the processor to execute a method, the instructions comprising:
instructions to receive business logic that defines a membership for a group;
instructions to determine a structure for the group based on the business logic, wherein the structure comprises a hierarchy having two or more nodes;
instructions to determine the hierarchy of the group based on the business logic;
instructions to determine a membership for each of the two or more nodes in the group;
instructions to determine a threshold for each of the two or more nodes in the group, wherein the threshold defines if the membership of the node is present;
instructions to create a rule for the group based on the business logic; and
instructions to store the rule.

15. The computer program product as defined in claim 14, wherein the threshold for the node is determined by one of a group of algorithms comprising:
at least one individual of two or more individuals in the membership is present;
all individuals in the membership are present;
a predetermined percentage of all individual in the membership are present; and
a predetermined number of individuals of all individuals in the membership are present.

16. The computer program product as defined in claim 14, wherein the rule for the group can include at least one of a group comprising:
a time-of-day rule to limit presence of the group or a node based on the time of day;
a geographic location rule that limits a presence for the group or the node based on geophysical location;
a medium rule that limits a presence for the group or the node based on the medium or channel of communication available; and
a state limitation rule that limits presence for the group or the node based on a state.

17. The computer program product as defined in claim 14, wherein the membership of the group can be a collection of other groups or sub-groups.

18. The computer program product as defined in claim 14, wherein the membership of the group is defined by attributes derived from an enterprise directory.

19. The computer program product as defined in claim 14, wherein the rule changes if the business logic is changed.

* * * * *